(12) United States Patent
Gilson

(10) Patent No.: US 11,081,143 B2
(45) Date of Patent: *Aug. 3, 2021

(54) PROVIDING ENHANCED CONTENT

(71) Applicant: TIVO CORPORATION, San Jose, CA (US)

(72) Inventor: Ross Gilson, Philadelphia, PA (US)

(73) Assignee: TiVo Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,646

(22) Filed: Jan. 30, 2020

(65) Prior Publication Data

US 2020/0243117 A1    Jul. 30, 2020

Related U.S. Application Data

(63) Continuation of application No. 15/800,628, filed on Nov. 1, 2017, now Pat. No. 10,593,369, which is a
(Continued)

(51) Int. Cl.
*H04N 7/167* (2011.01)
*H04N 21/2343* (2011.01)
(Continued)

(52) U.S. Cl.
CPC ........ *G11B 27/3063* (2013.01); *G11B 27/005* (2013.01); *H04N 9/87* (2013.01);
(Continued)

(58) Field of Classification Search
USPC ........ 386/246; 370/252, 328, 406, 392, 401, 370/422, 471; 709/228, 246, 203, 231,
(Continued)

(56) References Cited

U.S. PATENT DOCUMENTS 4,568,981 A * 2/1986 Beaulier ................ H04N 5/278
348/586
5,848,239 A   12/1998 Ando
(Continued)

OTHER PUBLICATIONS

EP Application No. 11179017.6, European Search Report, dated Dec. 13, 2011.
(Continued)

*Primary Examiner* — Jude Jean Gilles
(74) *Attorney, Agent, or Firm* — Haley Guiliano LLP

(57) ABSTRACT

Methods, systems, computer readable media, and apparatuses for providing enhanced content are presented. Data including a first program, a first caption stream associated with the first program, and a second caption stream associated with the first program may be received. The second caption stream may be extracted from the data, and a second program may be encoded with the second caption stream. The first program may be transmitted with the first caption stream including first captions and may include first content configured to be played back at a first speed. In response to receiving an instruction to change play back speed, the second program may be transmitted with the second caption stream. The second program may include the first content configured to be played back at a second speed different from the first speed, and the second caption stream may include second captions different from the first captions.

20 Claims, 14 Drawing Sheets

Related U.S. Application Data continuation of application No. 14/257,548, filed on Apr. 21, 2014, now Pat. No. 9,837,126, which is a continuation of application No. 13/494,102, filed on Jun. 12, 2012, now Pat. No. 8,707,349, which is a continuation of application No. 12/874,517, filed on Sep. 2, 2010, now Pat. No. 8,234,411.

(51) Int. Cl.

| | | |
|---|---|---|
| *H04N 21/235* | (2011.01) | |
| *H04N 21/2387* | (2011.01) | |
| *G11B 27/30* | (2006.01) | |
| *H04N 21/488* | (2011.01) | |
| *G11B 27/00* | (2006.01) | |
| *H04N 9/87* | (2006.01) | |
| *G06F 15/16* | (2006.01) | |
| *G06F 13/00* | (2006.01) | |

(52) U.S. Cl.
CPC ..... *H04N 21/2358* (2013.01); *H04N 21/2387* (2013.01); *H04N 21/234381* (2013.01); *H04N 21/4884* (2013.01)

(58) Field of Classification Search
USPC .................................................. 709/219, 217
See application file for complete search history.

(56) References Cited

U.S. PATENT DOCUMENTS

| | | | |
|---|---|---|---|
| 5,959,687 A | 9/1999 | Dinwiddie et al. | |
| 6,208,383 B1 | 3/2001 | Park | |
| 6,482,011 B1 | 11/2002 | Lee et al. | |
| 6,567,127 B1 | 5/2003 | Orr et al. | |
| 6,647,535 B1* | 11/2003 | Bozdagi | H04N 7/0885 |
| | | | 715/255 |
| 7,434,247 B2 | 10/2008 | Dudkiewicz et al. | |
| 7,617,272 B2 | 11/2009 | Bulson et al. | |
| 8,234,411 B2* | 7/2012 | Gilson | G11B 27/005 |
| | | | 709/246 |
| 8,306,402 B2 | 11/2012 | Ishihara | |
| 8,707,349 B2* | 4/2014 | Gilson | G11B 27/3063 |
| | | | 725/32 |
| 9,837,126 B2* | 12/2017 | Gilson | H04N 21/2387 |
| 10,593,369 B2* | 3/2020 | Gilson | H04N 9/87 |
| 2002/0001453 A1 | 1/2002 | Mizumura et al. | |
| 2002/0038460 A1 | 3/2002 | Kimoto | |
| 2002/0144262 A1 | 10/2002 | Plotnick et al. | |
| 2004/0034874 A1 | 2/2004 | Hord et al. | |
| 2004/0131073 A1* | 7/2004 | Hahn | H04L 41/0213 |
| | | | 370/422 |
| 2004/0179817 A1 | 9/2004 | Chou | |
| 2005/0058435 A1 | 3/2005 | Chung | |
| 2005/0117889 A1 | 6/2005 | Seita | |
| 2006/0085823 A1 | 4/2006 | Bell et al. | |
| 2006/0170819 A1 | 8/2006 | Lim et al. | |
| 2006/0218602 A1 | 9/2006 | Sherer et al. | |
| 2007/0136777 A1 | 6/2007 | Hasek et al. | |
| 2007/0204310 A1 | 8/2007 | Hua et al. | |
| 2008/0043737 A1* | 2/2008 | George | G06F 13/4022 |
| | | | 370/392 |
| 2008/0068993 A1 | 3/2008 | Roos et al. | |
| 2008/0243996 A1 | 10/2008 | Wu et al. | |
| 2008/0253406 A1 | 10/2008 | Hasek | |
| 2008/0292272 A1 | 11/2008 | Yamazaki et al. | |
| 2008/0310379 A1* | 12/2008 | Lim | H04W 24/00 |
| | | | 370/338 |
| 2009/0094659 A1 | 4/2009 | Candelore | |
| 2009/0116330 A1 | 5/2009 | Yang | |
| 2009/0133966 A1 | 5/2009 | Shibata | |
| 2009/0185790 A1 | 7/2009 | Kim | |
| 2009/0224717 A1 | 9/2009 | Sawaragi et al. | |
| 2009/0280944 A1 | 11/2009 | Hiraoka et al. | |
| 2009/0317053 A1 | 12/2009 | Morley et al. | |
| 2010/0040349 A1 | 2/2010 | Landy | |
| 2010/0180043 A1 | 7/2010 | Lau et al. | |
| 2011/0069043 A1 | 3/2011 | Lee et al. | |
| 2011/0203785 A1 | 8/2011 | Federspiel et al. | |
| 2012/0120832 A1* | 5/2012 | Krimmel | H04L 1/0041 |
| | | | 370/252 |
| 2013/0027514 A1 | 1/2013 | Cho et al. | |
| 2017/0046640 A1 | 2/2017 | Varadi et al. | |

OTHER PUBLICATIONS

CA Application No. 2,750,500, Canadian Office Action, dated Apr. 21, 2017.
Apr. 25, 2018—Canadian Office Action—CA 2,750,500.

* cited by examiner

PROVIDING ENHANCED CONTENT

CROSS-REFERENCE TO RELATED APPLICATIONS

The present application is a continuation of and claims priority to U.S. patent application Ser. No. 15/800,628, filed on Nov. 1, 2017 and entitled "Providing Enhanced Content," which is a continuation of U.S. patent application Ser. No. 14/257,548, filed on Apr. 21, 2014 (U.S. Pat. No. 9,837,126 issued on Dec. 5, 2017), which is a continuation of U.S. patent application Ser. No. 13/494,102, filed on Jun. 12, 2012 (U.S. Pat. No. 8,707,349 issued on Apr. 22, 2014), which is a continuation of U.S. patent application Ser. No. 12/874,517, filed on Sep. 2, 2010 (U.S. Pat. No. 8,234,411 issued on Jul. 31, 2012). These prior applications are incorporated herein by reference in their entirety.

BACKGROUND

Aspects of this disclosure relate to computer processing and networking technologies, broadband communications technologies, satellite communications technologies, fiber-optic communications technologies, video processing technologies, and/or multimedia computing technologies. In particular, aspects of this disclosure relate to providing enhanced content in these various contexts.

In currently existing multimedia content distribution systems and multimedia content consumption systems, captioning functionalities may be implemented to provide various ways of including and/or displaying captions representing transcripts of the audio portions of various multimedia programs. As technology continues to develop, however, it may be desirable to provide more convenient, usable, and/or advanced captioning functionalities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to providing enhanced content. According to one or more aspects, data may be received, and the data may include a first data asset (e.g., a video program, an audio program, other content, etc.), a first caption stream associated with the first data asset, and a second caption stream associated with the first data asset. In one or more arrangements, the data may be a received by a server that may be configured to process the data and then distribute it to one or more users and/or one or more user devices. Subsequently, the second caption stream may be extracted from the received data. Then, a second data asset may be encoded with the second caption stream. Thereafter, the first data asset may be transmitted with the first caption stream (e.g., to a user and/or a user device). The first data asset may include first content configured to be played back at a first speed, and the first caption stream may include first captions that also may be configured to be played back at the first speed. In response to receiving an instruction to change play back speed, the second data asset then may be transmitted with the second caption stream. The second data asset may include the first content configured to be played back at a second speed different from the first speed, and the second caption stream may include second captions different from the first captions. In at least one arrangement, the second captions may include enhanced captions, as further described below.

According to one or more additional aspects, a first data asset having at least two caption streams may be recorded (e.g., by a user and/or a user device). Subsequently, the first data asset may be played back with a first caption stream of the at least two caption streams. Then, in response to receiving an instruction to change playback speed from a first speed to a second speed, a second caption stream of the at least two caption streams may be switched to from the first caption stream. In at least one arrangement, the first caption stream may be associated with the first speed, and the second caption stream may be associated with the second speed. In one or more arrangements, the second caption stream may include enhanced captions, as further described below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
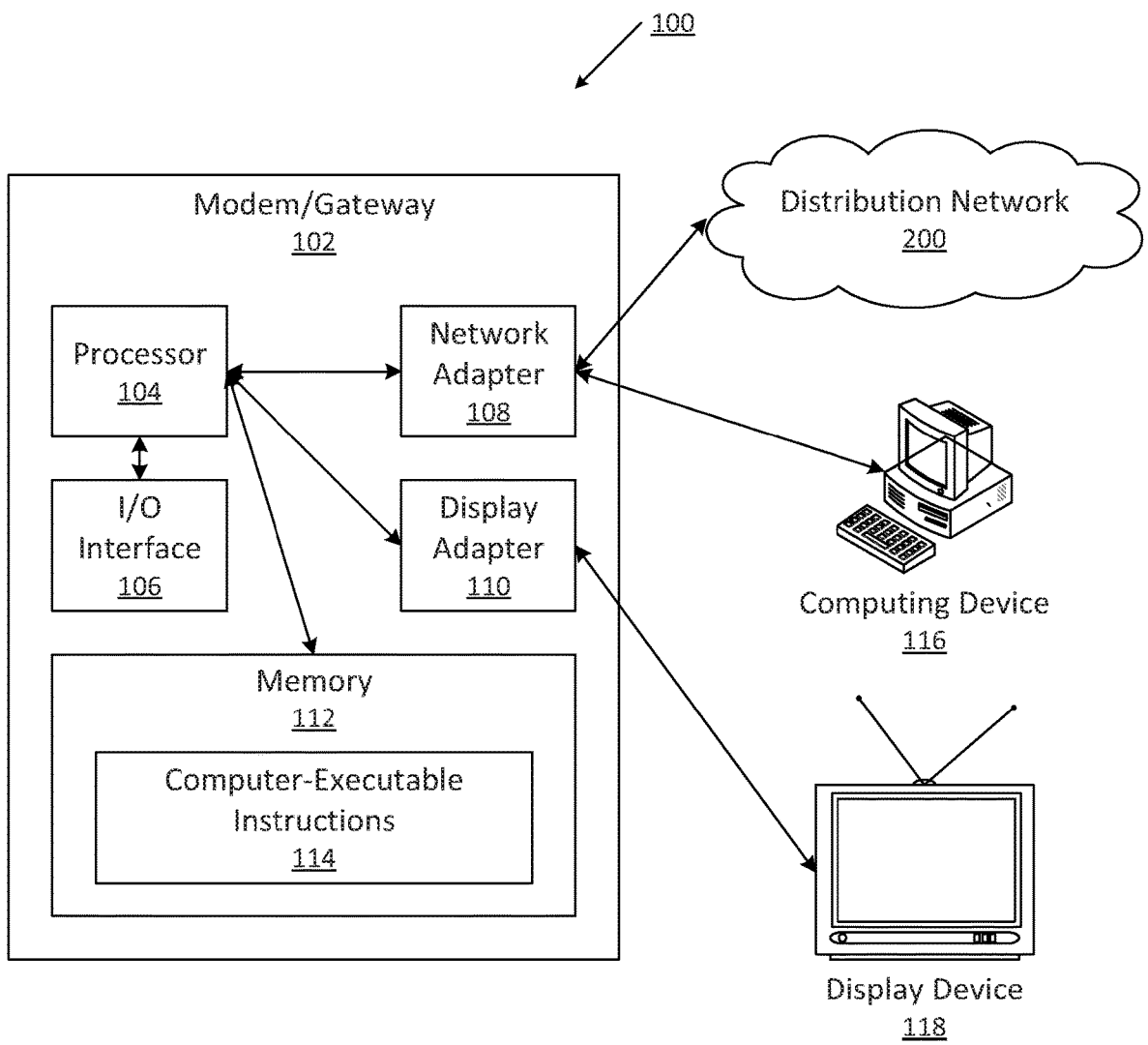
FIG. 1 illustrates an example operating environment according to one or more aspects described herein.

FIG. 1 illustrates an example operating environment according to one or more aspects described herein. In one or more arrangements, operating environment 100 may include a receiving device, such as a modem/gateway device (e.g., gateway 102). Gateway 102 may include a plurality of communicatively coupled components which may enable gateway 102 to perform a variety of functions. For example, gateway 102 may include a processor 104 that may be configured to store and/or execute computer-readable and/or computer-executable instructions (e.g., software). Additionally or alternatively, processor 104 may control other components included in gateway 102, such as those described below.

In at least one arrangement, gateway 102 may include an input/output interface 106, which may enable gateway 102 to receive input from a user (e.g., via a remote control, keyboard, mouse, touch pad and/or stylus, touch screen, etc.). Gateway 102 further may include a network adapter 108, which may enable gateway 102 to connect to one or more computing devices (e.g., computing device 116) and/or one or more networks (e.g., a distribution network, such as distribution network 200; a local area network ("LAN"); and/or a wide area network ("WAN"), such as the Internet). Network adapter 108 may implement one or more wired and/or wireless communication protocols, such as ETHERNET, IEEE 802.11, BLUETOOTH, HTTP, TCP/IP, MoCA (Multimedia over Coax Alliance), and/or the like. Additionally or alternatively, network adapter 108 may enable gateway 102 to transmit and/or receive electronic signals over a hybrid fiber/coaxial cable network, a fiber optic network, a satellite network, a digital subscriber line (DSL) network, a wireless network, and/or the like.

In one or more arrangements, gateway 102 also may include a display adapter 110, which may enable gateway 102 to transmit and/or receive electronic signals to and/or from a display device, such as display device 118. Additionally or alternatively, gateway 102 may include memory 112, which may store computer-executable instructions 114. By executing one or more of the computer-executable instructions 114 stored in memory 112, processor 104 may cause gateway 102 to perform one or more methods described herein. In one or more configurations, other computing devices described herein may include similar components connected in similar ways. Accordingly, such other computing devices may provide similar functionalities and have similar capabilities. Among other things, such other computing devices may include one or more processors and/or one or more memories storing computer-executable instructions that, when executed by one or more processors, cause such devices, either alone or in combination, to perform one or more methods described herein. Moreover, in at least one arrangement, gateway 102 may be implemented as one or more hardware and/or software components included in another device (e.g., computing device 116).

Figure 2:
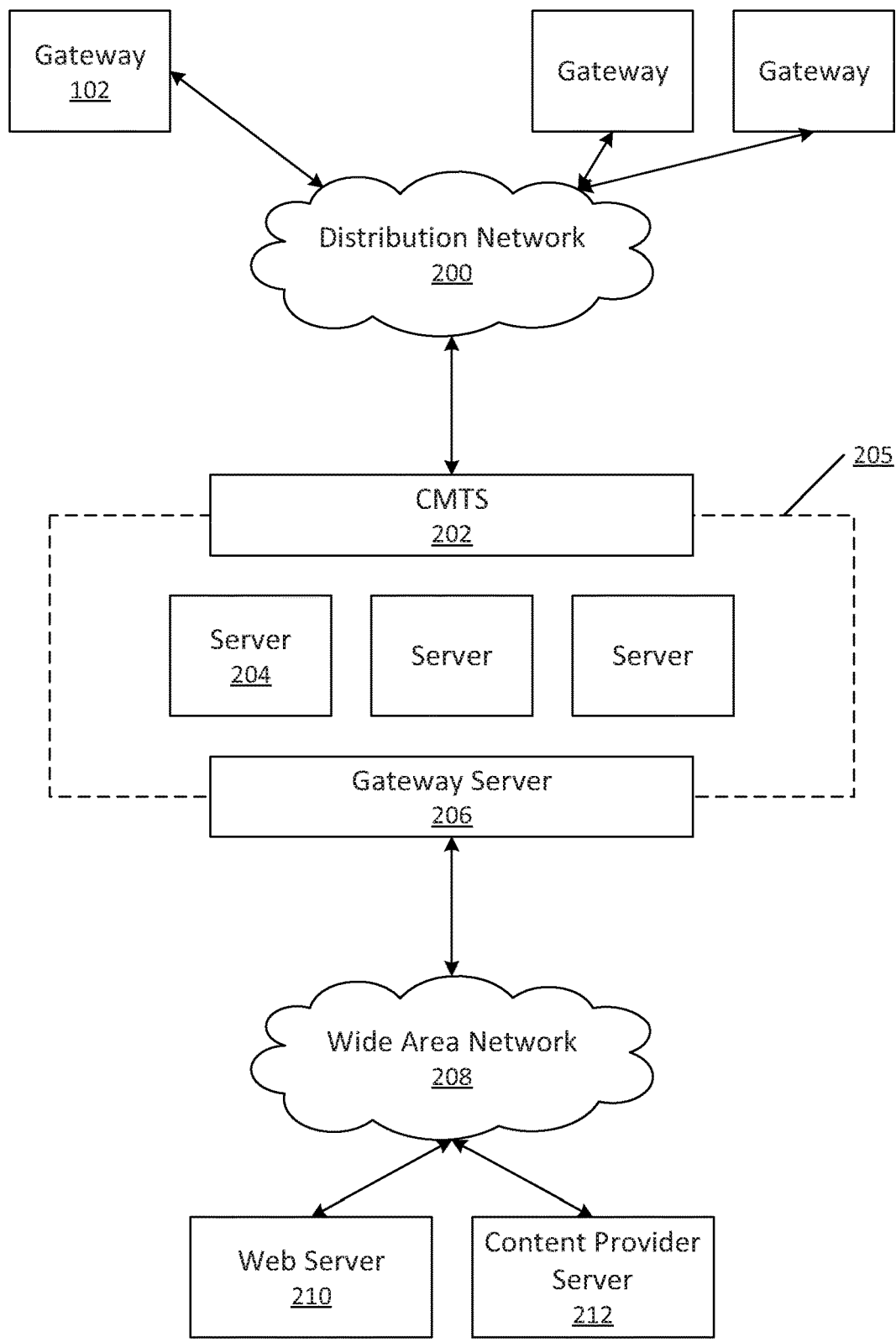
FIG. 2 illustrates an example network environment according to one or more aspects described herein.

FIG. 2 illustrates an example network environment according to one or more aspects described herein. As described above with respect to FIG. 1, and as may be seen in FIG. 2, gateway 102 may be communicatively linked to a distribution network, such as distribution network 200. Distribution network 200 may include one or more coaxial cable, optical fiber, hybrid fiber/coaxial (HFC) cable, cellular, satellite, WiMax, and/or other connections, which may facilitate communication between a server 205 (e.g., a headend, a content distribution center, a central office, etc.) and one or more gateways (e.g., gateway 102). For example, distribution network 200 may include a series of communication links, such as cables and splitters, leading from a server 205 to various homes in a neighborhood. Some or all of these communication links may be a combination of fiber optical and coaxial links, resulting in a hybrid fiber/coaxial (HFC) distribution network. Additionally or alternatively, some or all of these communication links may be coaxial or wireless.

In one or more arrangements, gateway 102 and/or the other one or more gateways that may be connected to distribution network 200 each may include an interface device that is configured to receive content from the server 205 (e.g., the headend, the content distribution center, the central office, etc.), as well as processing circuitry to convert the content into a format for consumption by a user of one or more consumption devices that may be communicatively connected to the one or more gateways. The content may include any desired type of information, such as video content, audio content, Internet Protocol data, and/or television programming. The one or more consumption devices may include one or more televisions, high-definition televisions (HDTVs), monitors, host viewing devices, MP3 players, audio receivers, radios, communication devices, personal computers, media players, digital video recorders, game playing devices, smart phones, and/or the like. Additionally or alternatively, one or more consumption devices may be implemented as a transceiver having interactive capability in connection with a gateway (e.g., gateway 102) and/or a server (e.g., server 205).

According to one or more aspects, a gateway (e.g., gateway 102) may provide a user with access to a wide area network (e.g., wide area network 208, which may include the Internet), as well as various other devices included in wide area network 208, such as web server 210 and/or content provider server 212. Content received at gateway 102 may be supplemented and/or customized by data obtained via wide area network 208. The gateway (e.g., gateway 102) also may enable on-premises communication among devices at the user's locations, such as one or more routers, televisions, computers, and/or the like. Additionally or alternatively, gateway 102 may route data received and/or transmitted via distribution network 200 to one or more devices at the user's location.

In one or more configurations, the gateways connected to distribution network 200 may include, for example, one or more cable modems, optical interface devices, set-top boxes (STBs), and/or digital video recorders (DVRs). Thus, the network environment may be used as a media service provider/subscriber system in which a provider and/or vendor may operate the server 205 (e.g., one or more headends, content distribution centers, central offices, etc.) and/or the distribution network 200, and the provider and/or vendor further may provide a user (e.g., a subscriber, client, customer, service purchaser, etc.) with one or more receiving devices (e.g., gateway 102). In at least one configuration, a user (e.g., a subscriber, client, customer, service purchaser, etc.) may provide and/or use his or her own receiving device(s).

In one or more arrangements, the network environment further may include one or more servers 205. Each server 205 may include a plurality of devices and/or components, such as other data servers (e.g., server 204), computers, processors, memories, data storage devices (e.g., hard drives), security encryption and decryption apparatuses, and/or the like. In at least one arrangement, server 205 may comprise a server cluster, data center, central office, and/or the like, and in such an arrangement, server 205 may include additional servers (e.g., server 204). In one configuration, such as an HFC-type system, one or more devices in each server 205 may comprise a Modem Termination System (MTS) and/or a Cable Modem Termination Server (CMTS) 202, and such an MTS and/or CMTS 202 may facilitate communication between each server 205 and one or more gateways (e.g., gateway 102).

In one or more arrangements, each server 205 also may be connected to one or more wide area networks (e.g., wide area network 208, which may include the Internet) via a network gateway server 206. Additionally or alternatively, via wide area network 208, each server 205 may be able to access other devices connected to wide area network 208, such as web server 210 (which may, for example, host one or more websites) and/or content provider server 212 (which may, for example, store and/or provide content, such as audiovisual programming).

In one or more arrangements, a gateway (e.g., gateway 102) may receive programming (e.g., television programming via a transport stream transmitted over distribution network 200, such as an electronically transmitted MPEG transport stream), and a connected display device (e.g., display device 118) may display such programming. In at least one arrangement, such programming may include video on-demand (VOD) programming. Additionally or alternatively, such programming may include one or more captions and/or enhanced captions, as further described below.

Figure 3:
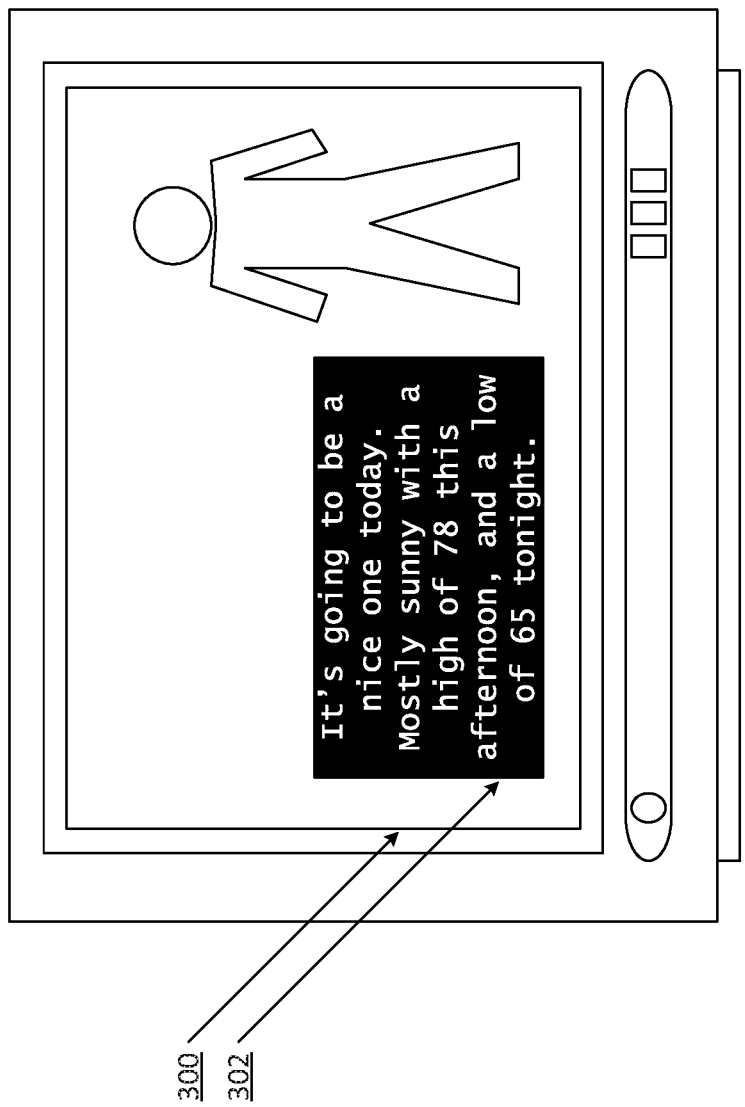
FIG. 3 illustrates an example user interface screen including captions according to one or more aspects described herein.

FIG. 3 illustrates an example user interface screen including captions according to one or more aspects described herein. In one or more configurations, any and/or all of the user interfaces described herein may be generated by a receiver (e.g., gateway 102) and/or displayed on a display device (e.g., display device 118), which may be associated with the receiver. Additionally or alternatively, any and/or all of the user interfaces described herein may be generated by a device (e.g., computing device 116, display device 118, etc.) and displayed on the same device.

In one or more arrangements, the caption illustrated in user interface 300 of FIG. 3 may represent a closed caption, which may be used in currently existing systems to display the audio content associated with a video program (e.g., a television program) in textual form (e.g., as a transcript of the words, lyrics, and/or other sounds that may be included in the audio content associated with the television program). For example, user interface 300 may include a content display area in which content (e.g., multimedia content, television programming, etc.) may be displayed. In particular, user interface 300 may include a displayed video program, and the program may include one or more captions, such as caption 302. Caption 302 may include one or more lines of text that may represent a transcript of the audio content associated with the displayed video program. By implementing such captions, a system may provide improved functionalities to users who have impaired hearing, users who wish to view content (e.g., television programs) without sound, and/or other users.

In currently existing systems, closed captions thus may be a useful way of displaying a transcript of the audio content associated with a currently playing video program. As content delivery technologies continue to develop, however, closed captions may be enhanced and improved to provide greater convenience and usability to users. For example, a user may be viewing "on-demand" audiovisual content in their home (e.g., via gateway 102, computing device 116, and/or display device 118), and the user may wish to fast forward, rewind, play in slow motion, or otherwise change the playback speed of the audiovisual content. In currently existing systems, the one or more captions associated with the audiovisual content might not be displayed during the fast forward or rewind operation, for instance. Moreover, if such captions are displayed during the fast forward or rewind operation, they might be useless to a user as they might be quickly displayed and removed to the extent that they represent a transcript of audio content that is being fast forwarded or rewound. Of course, while fast forward and rewind operations are used as examples of alternate playback speeds above and throughout this disclosure, it is contemplated that similar concerns may arise with respect to any alternate-speed playback operation, and one or more of the arrangements described herein may be used with any alternate-speed playback operation (e.g., slow motion, slow reverse, etc.).

According to one or more aspects of the disclosure, enhanced content may be provided via closed captions during an alternate-speed playback operation. For example, rather than displaying captions representing a transcript of the audio content of a video program at the particular alternate playback speed, a system implementing one or more aspects of the disclosure may display captions that include different information, which may provide greater convenience and usability to a user. Of course, the captions, methods, systems, apparatuses, media, and/or other aspects described herein may also be implemented to enhance normal-speed playback operations in ways similar to those described herein.

In one or more arrangements, the enhanced content to be displayed may correspond to the playback speed of the programming. For instance, where a user is fast forwarding through programming, the user may be trying to locate the next scene. Thus, in a situation where a user is fast forwarding through programming, displaying enhanced content may include displaying information to assist the user in locating the next scene (e.g., a caption stating "Next scene in 11 seconds."). On the other hand, where a user is slowly rewinding through programming, the user may be trying to replay a small portion of the video and/or audio programming (e.g., a line recently spoken by an actor). Thus, in a situation where a user is slowly rewinding through programming, displaying enhanced content may include displaying information to assist the user in replaying recently elapsed content (e.g., displaying one or more captions that visually represent the previous five seconds of audio content). In another example, where a user is playing programming at a forward slow-motion playback speed, displaying enhanced content may comprise displaying one or more captions that include information representing a transcript of the audio portion of the programming, as well as additional information, such as one or more scene descriptions, time counters, recommendations, advertising, and/or other enhanced content, as further described below. For instance, where a user is playing programming at a forward slow-motion playback speed, one or more time counters may be displayed that indicate the time until the next scene change and/or camera cut. In this example, the slowed playback speed of the programming may increase the desirability of including enhanced content, as a user viewing the programming may have more time to view and/or more interest in viewing the enhanced content.

FIGS. 4A-4I illustrate example user interface screens including enhanced content according to one or more aspects described herein. According to one or more aspects, any and/or all of the user interfaces described herein may be generated by a receiver (e.g., gateway 102) and/or displayed on a display device (e.g., display device 118), which may be associated with the receiver. Additionally or alternatively, any and/or all of the user interfaces described herein may be generated by a device (e.g., computing device 116, display device 118, etc.) and displayed on the same device.

Figure 4A:
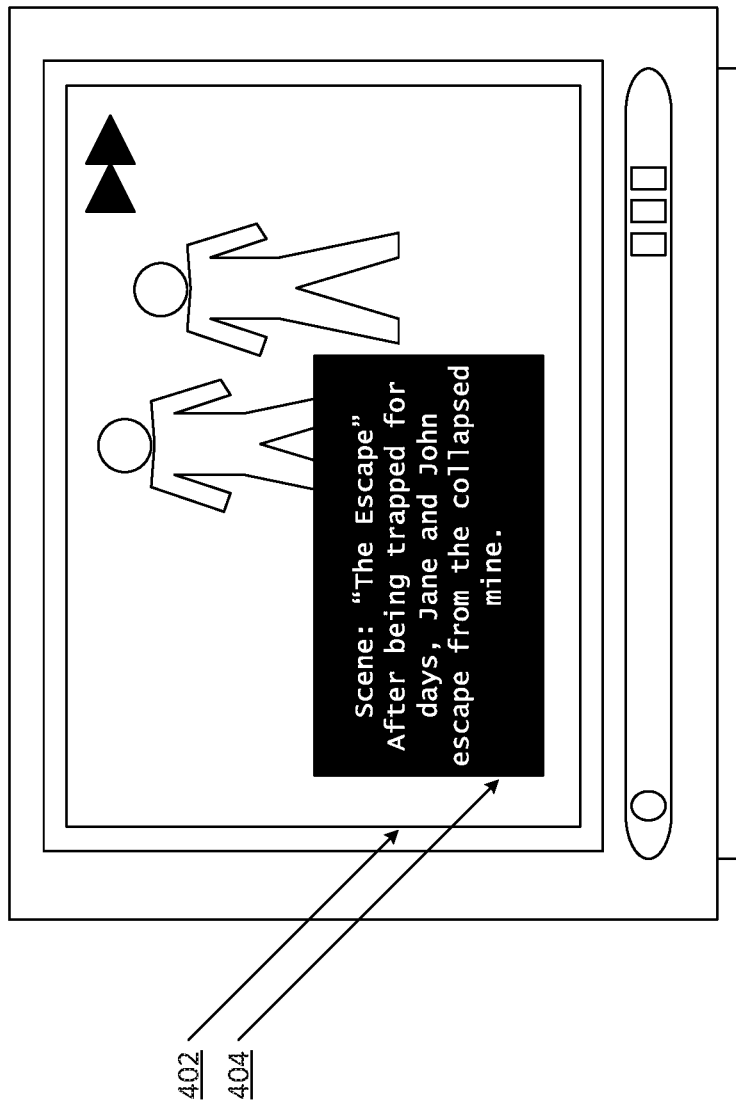
FIGS. 4A-4I illustrate example user interface screens including enhanced content according to one or more aspects described herein.

For example, as may be seen in FIG. 4A, user interface 402 may include enhanced caption 404. Enhanced caption 404 may be displayed when the video content (e.g., program, video clip, multimedia data file, etc.) is played back at an alternate speed (e.g., fast forward, rewind, etc.). As described above, when video content, such as a television program, is played back at an alternate speed, it might not be desirable to display captions representing a transcript of the audio content associated with the video content. Thus, in one or more arrangements, when an alternate-speed playback mode is entered, enhanced caption 404 may be provided, and enhanced caption 404 may include text and/or other data that may be more useful to a user in viewing the video content at an alternate speed. For instance, enhanced caption 404 may include the title of the scene currently playing in the video content and/or a short description of the scene. Additionally or alternatively, as the video content continues to be played back at the alternate speed, enhanced caption 404 may be updated to indicate, for example, the current scene title and/or the current scene description.

Figure 4B:
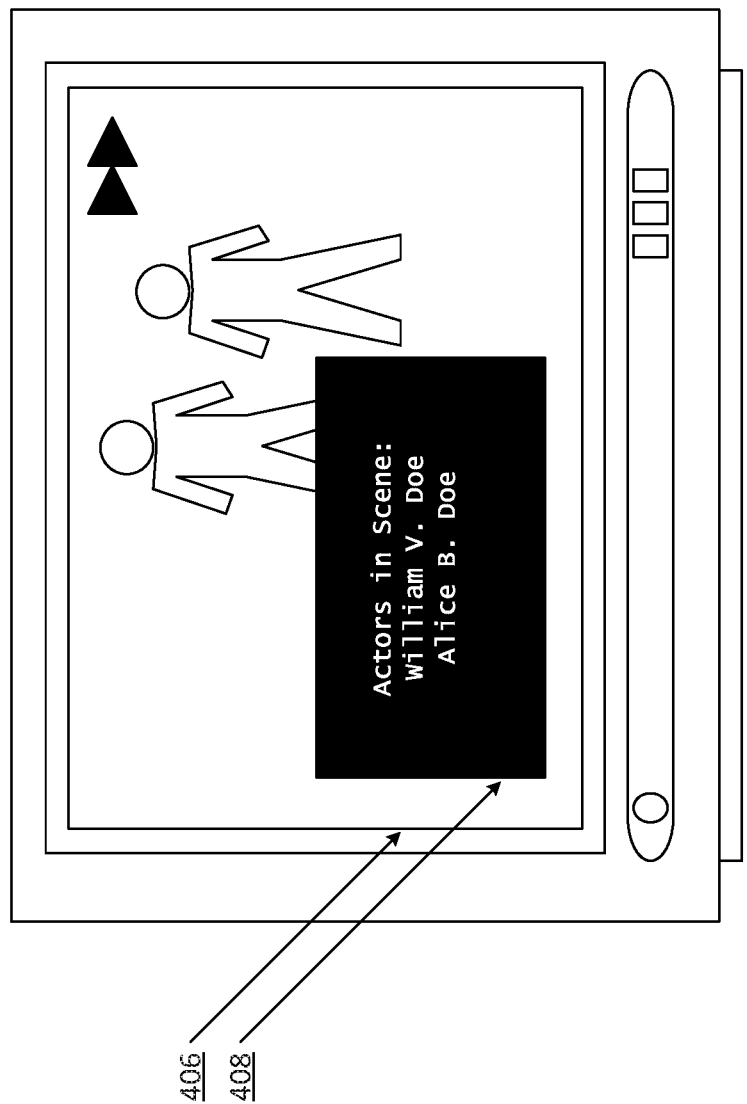

FIG. 4B illustrates another example of a user interface that includes an enhanced caption. As may be seen in user interface 406 of FIG. 4B, enhanced caption 408 may include a list of actors in the scene currently playing in the video content Like enhanced caption 404 of FIG. 4A, enhanced caption 408 may be updated as the video content continues to be played back at the alternate speed (e.g., as the fast forward or rewind operation continues).

Figure 4C:
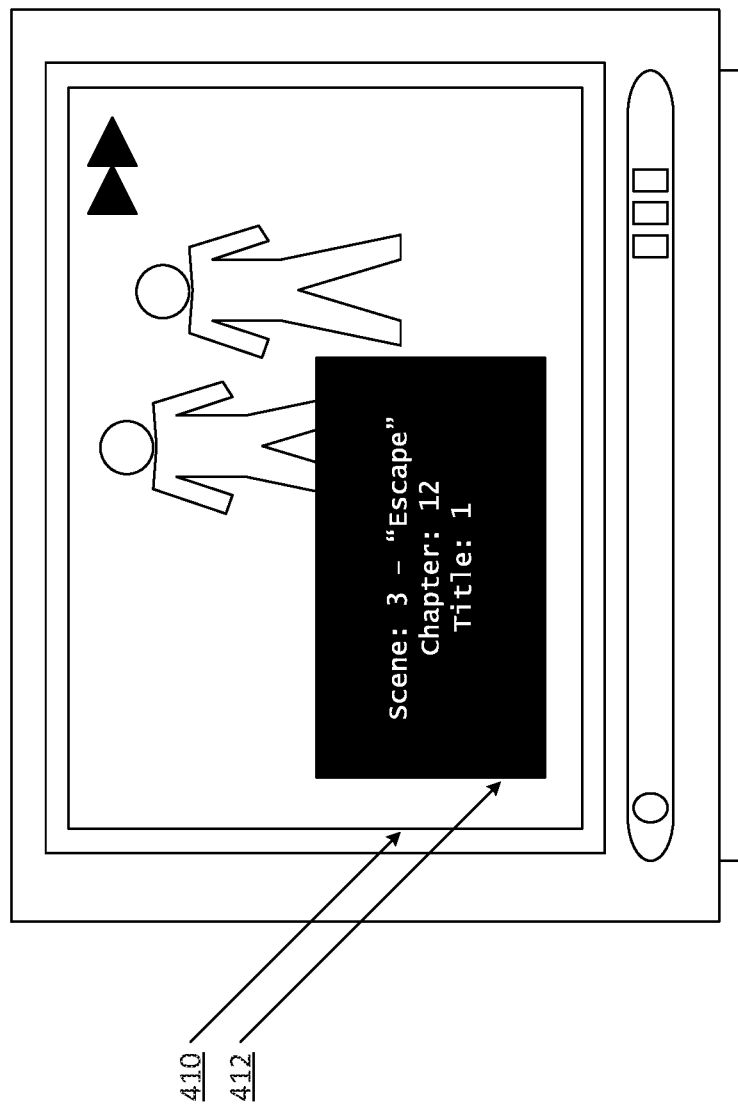

FIG. 4C illustrates yet another example of a user interface that includes an enhanced caption. As may be seen in user interface 410 of FIG. 4C, enhanced caption 412 may include information that may identify the current scene, chapter, and/or title currently playing in the video content. Like enhanced caption 404 of FIG. 4A, enhanced caption 412 may be updated as the video content continues to be played back at the alternate speed (e.g., as the fast forward or rewind operation continues).

Figure 4D:
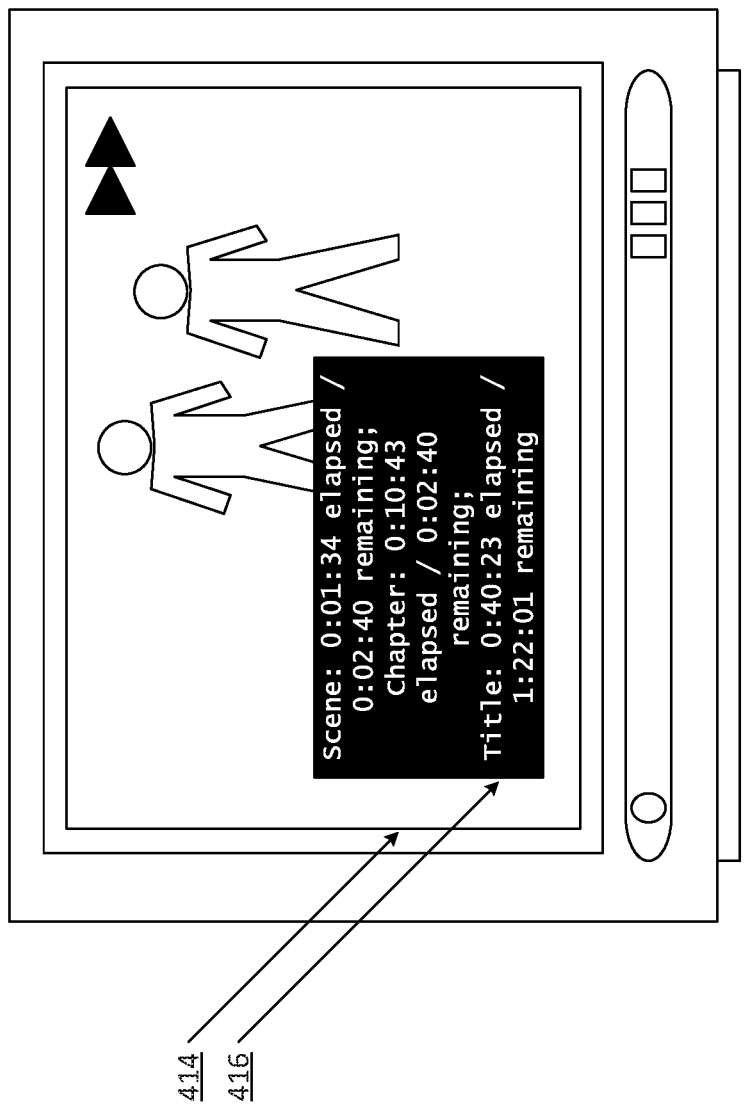

FIG. 4D illustrates another example of a user interface that includes an enhanced caption. As may be seen in user interface 414 of FIG. 4D, enhanced caption 416 may include time counters that may indicate the time elapsed and/or remaining in the current scene, chapter, and/or title currently playing the video content. Of course, a time counter implemented in an enhanced caption may show other times relevant to the video content. For instance, during a fast forward operation and/or a rewind operation (or any other alternate speed playback operation), a time counter may include one or more counters that correlate alternate-speed time with real time. For example, where a user is fast forwarding through programming at four times the normal playback speed, a time counter stating "Next scene in 11 seconds" may be displayed, where the next scene is eleven seconds away at four times the normal playback speed, but forty-four seconds away at the normal playback speed. Additionally or alternatively, like enhanced caption 404 of FIG. 4A, enhanced caption 416 may be updated as the video content continues to be played back at the alternate speed (e.g., as the fast forward or rewind operation continues).

Figure 4E:
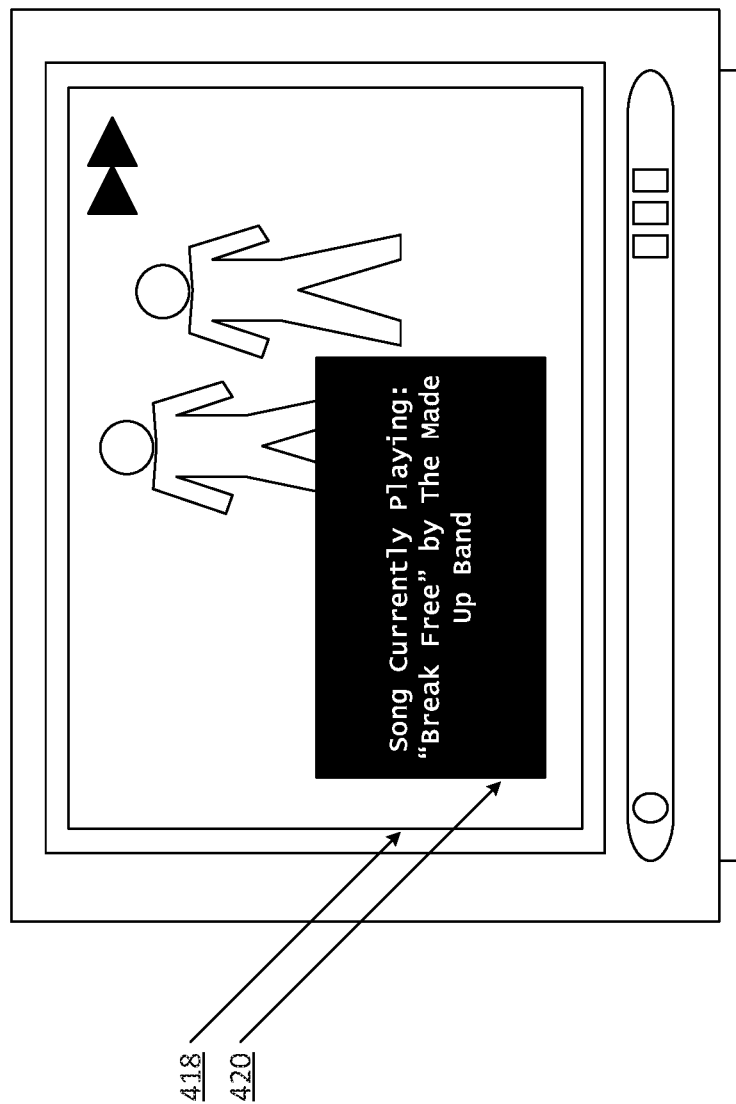

FIG. 4E illustrates yet another example of a user interface that includes an enhanced caption. As may be seen in user interface 418 of FIG. 4E, enhanced caption 420 may include information that may identify a song which may be playing in the audio portion of the video content. Enhanced caption 420 may assist a user in determining whether and/or what audio track is playing in the audio portion of the video content, as during a fast forward operation, for instance, the audio portion might not be played back. Once again, like enhanced caption 404 of FIG. 4A, enhanced caption 418 also may be updated as the video content continues to be played back at the alternate speed (e.g., as the fast forward or rewind operation continues).

Figure 4F:
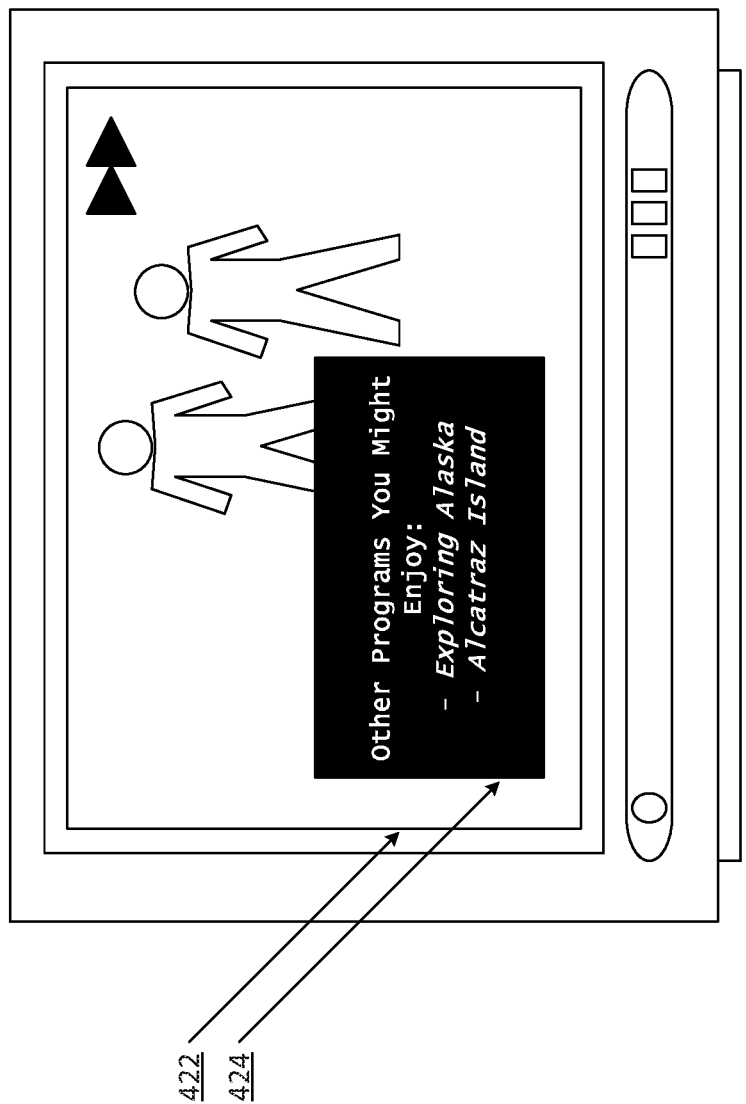

FIG. 4F illustrates another example of a user interface that includes an enhanced caption. As may be seen in user interface 422 of FIG. 4F, enhanced caption 424 may include a list of one or more recommended programs and/or other content, which the system may recommend based on the video content (e.g., television program) that the user is currently viewing and/or other user data (e.g., user preferences, user viewing history, and/or the like). Like enhanced caption 404 of FIG. 4A, enhanced caption 424 may be updated as the video content continues to be played back at the alternate speed (e.g., as the fast forward or rewind operation continues). Additionally or alternatively, the recommendations included in enhanced caption 424 may be updated as more content becomes available to the system.

Figure 4G:
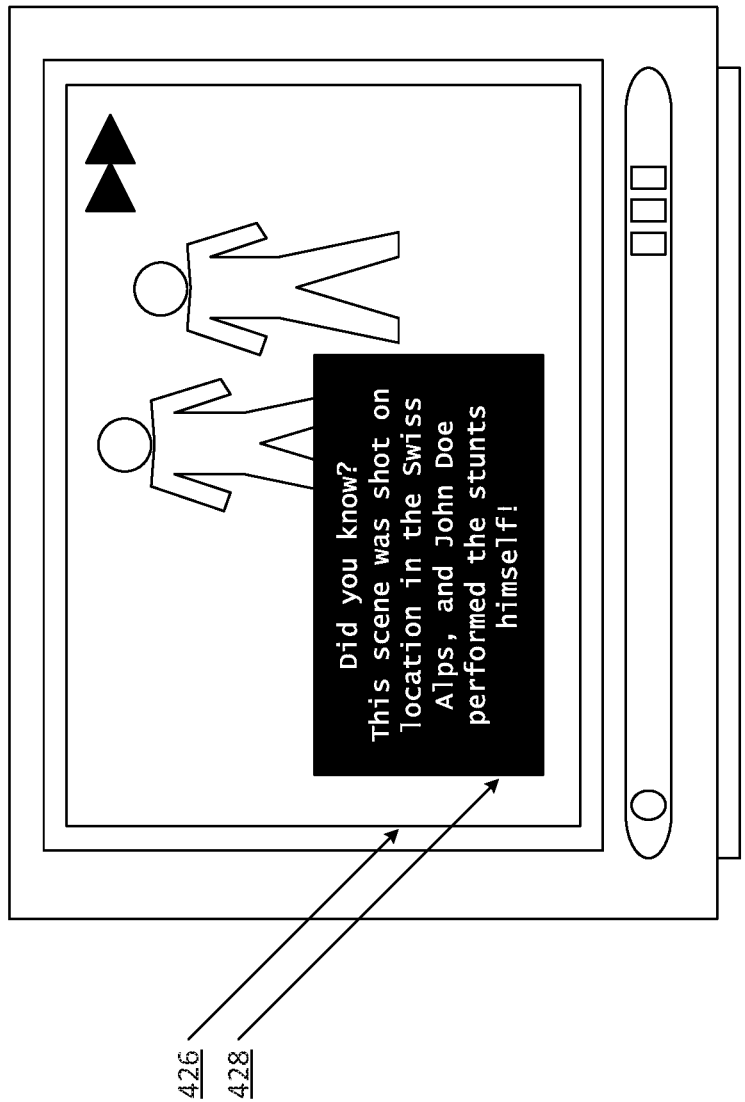

FIG. 4G illustrates still another example of a user interface that includes an enhanced caption. As may be seen in user interface 426 of FIG. 4G, enhanced caption 428 may include miscellaneous information related to the video content, such as trivia and/or other information. Like enhanced caption 404 of FIG. 4A, enhanced caption 428 may be updated as the video content continues to be played back at the alternate speed (e.g., as the fast forward or rewind operation continues).

Figure 4H:
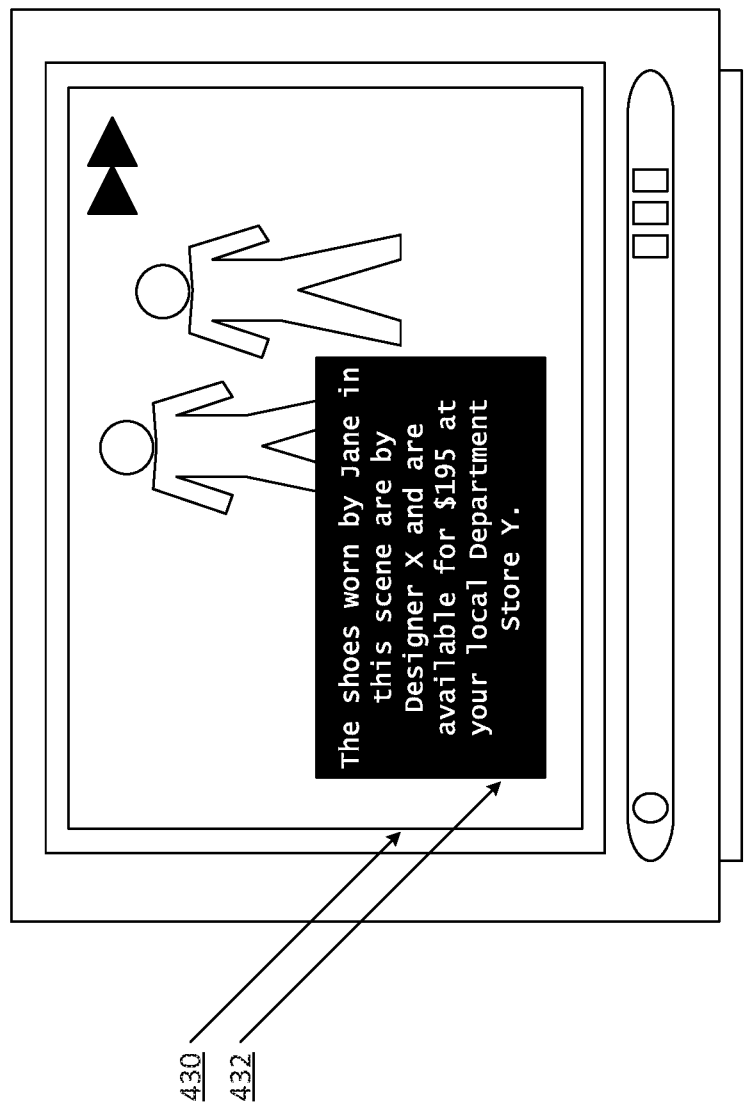

FIG. 4H illustrates another example of a user interface that includes an enhanced caption. As may be seen in user interface 430 of FIG. 4H, enhanced caption 432 may include advertising content. In one or more arrangements, such advertising content included in enhanced caption 432 may be selected automatically by the system to be relevant to the video content currently being displayed. For example, enhanced caption 432 may include an advertisement for shoes worn by a character in the currently playing video content in user interface 430. Additionally or alternatively, like enhanced caption 404 of FIG. 4A, enhanced caption 428 may be updated as the video content continues to be played back at the alternate speed (e.g., as the fast forward or rewind operation continues). Furthermore, the advertisements included in enhanced caption 432 may be updated periodically as more content becomes available and/or as it becomes desirable to include different advertisements. For instance, a content provider may wish to include an advertisement for jewelry in December to coincide with a particular scene in the video content, but in January, the content provider may wish to include a different advertisement for shoes to coincide with the same particular scene. To facilitate this change in advertising, the system may update enhanced caption 432 accordingly.

Figure 4I:
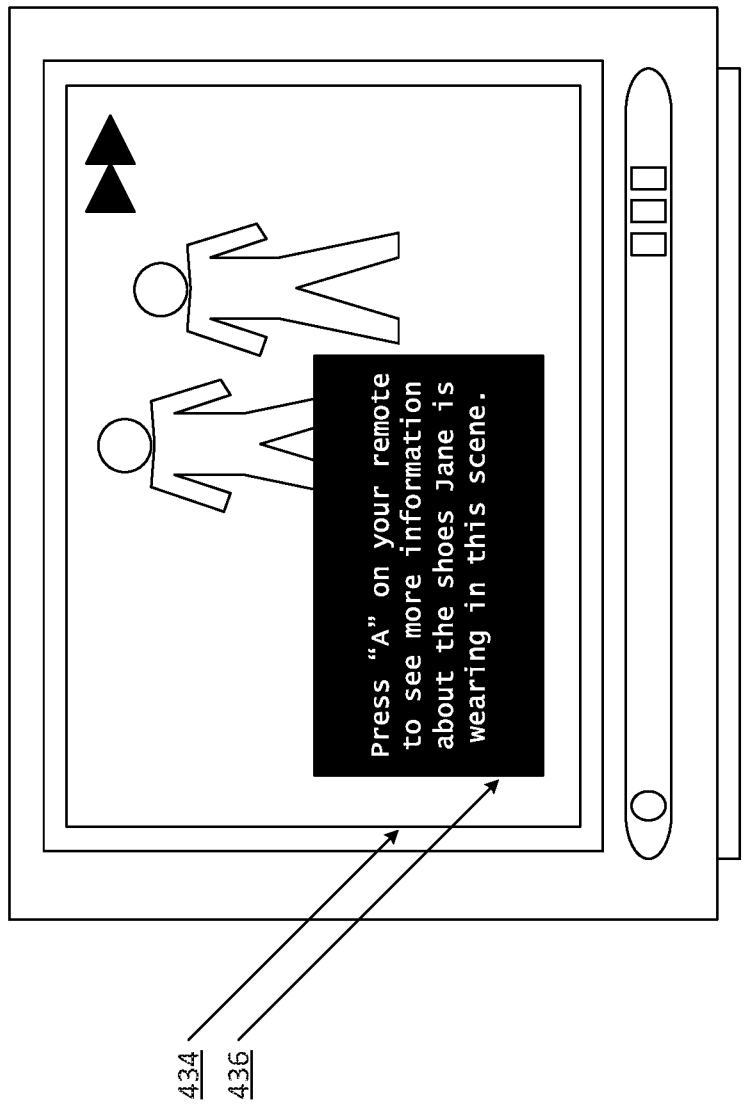

FIG. 4I illustrates yet another example of a user interface that includes an enhanced caption. As may be seen in user interface 434 of FIG. 4I, enhanced caption 436 may include an interactive prompt. For example, enhanced caption 436 may include an interactive prompt inviting a user to input a command (e.g., by pressing a button on gateway 102 and/or an associated remote control or other input device), and in response to receiving the command from the user, the system may perform an action. For instance, enhanced caption 436 may include text stating "Press 'A' on your remote to see more information about the shoes Jane is wearing in this scene." In response to detecting a button press of "A" on the user's remote control, the system may display in user interface 434 more information about Jane's shoes. In one or more arrangements, this functionality may be provided by gateway 102 receiving input from the user via an associated remote control and then transmitting a message to server 205, which then may transmit to gateway 102 the additional content requested by the user. In at least one arrangement, the additional content may be obtained from a website and/or the Internet, or a local network. In at least one additional arrangement, gateway 102 may directly access an Internet server to obtain the additional content requested by the user without querying an intermediate server.

In one or more arrangements, one or more enhanced captions that are associated with a caption stream corresponding to programming may be modified and/or selectively included in the caption stream based on one or more playback-specific factors. For example, enhanced captions associated with the caption stream may be modified and/or selectively included in the caption stream based on demographic and/or geographic information associated with a viewer (e.g., the viewer's location, zip code, age, gender, etc.). Thus, if the viewer is watching a sporting event between two football teams, for instance, and the viewer's location is determined to be closer to the home city of one of the football teams than the home city of the other, enhanced captions may be modified and/or selectively included in the caption stream that are associated with and/or favorable to the more closely located football team (e.g., enhanced captions that include advertisements for game tickets and/or merchandise for the more closely located football team may be added to the caption stream). In at least one arrangement, the user's location may be determined based on network information, billing information, device identification and/or detection information, and/or the like.

In another example, enhanced captions associated with the caption stream may be modified and/or selectively included in the caption stream based on access control information (e.g., parental control settings). Thus, if the viewer is watching an R-rated movie with parental controls unlocked, enhanced captions may be modified and/or selectively included in the caption stream that include information for adult viewers (e.g., enhanced captions that include advertisements for other R-rated movies, mature-rated video games, etc. may be added to the caption stream), whereas if the viewer is watching the R-rated movie with parental controls enabled, enhanced captions may be modified and/or selectively included in the caption stream that include information more suitable for younger viewers (e.g., enhanced captions that include advertisements for PG-rated or PG-13-rated movies, teen-rated video games, etc. may be added to the caption stream).

In yet another example, enhanced captions associated with the caption stream may be modified and/or selectively included in the caption stream based on time and/or date information. Thus, if the viewer is watching a program in the morning, enhanced captions may be modified and/or selectively included in the caption stream that include time-relevant content for morning hours (e.g., enhanced captions that include an advertisement of a lunch special at a local restaurant may be added to the caption stream), whereas if the viewer is watching a program in the evening, enhanced captions may be modified and/or selectively included in the caption stream that include time-relevant content for evening hours (e.g., enhanced captions that include an advertisement of a dinner special at a local restaurant may be added to the caption stream). Similarly, where an enhanced caption includes a recommendation and/or advertisement for another program, the enhanced caption may be included in the caption stream prior to the airing of the other program, and the enhanced caption might not be included in the caption stream after the airing of the other program.

While the foregoing examples describe particular types of content that may be included in enhanced captions according to one or more aspects described herein, it is contemplated that many other types of information could also be included in enhanced captions in addition to or in place of the types of content described above. Having described various types of content that may be included in enhanced captions, one or more methods for providing such functionalities will now be described.

Figure 5:
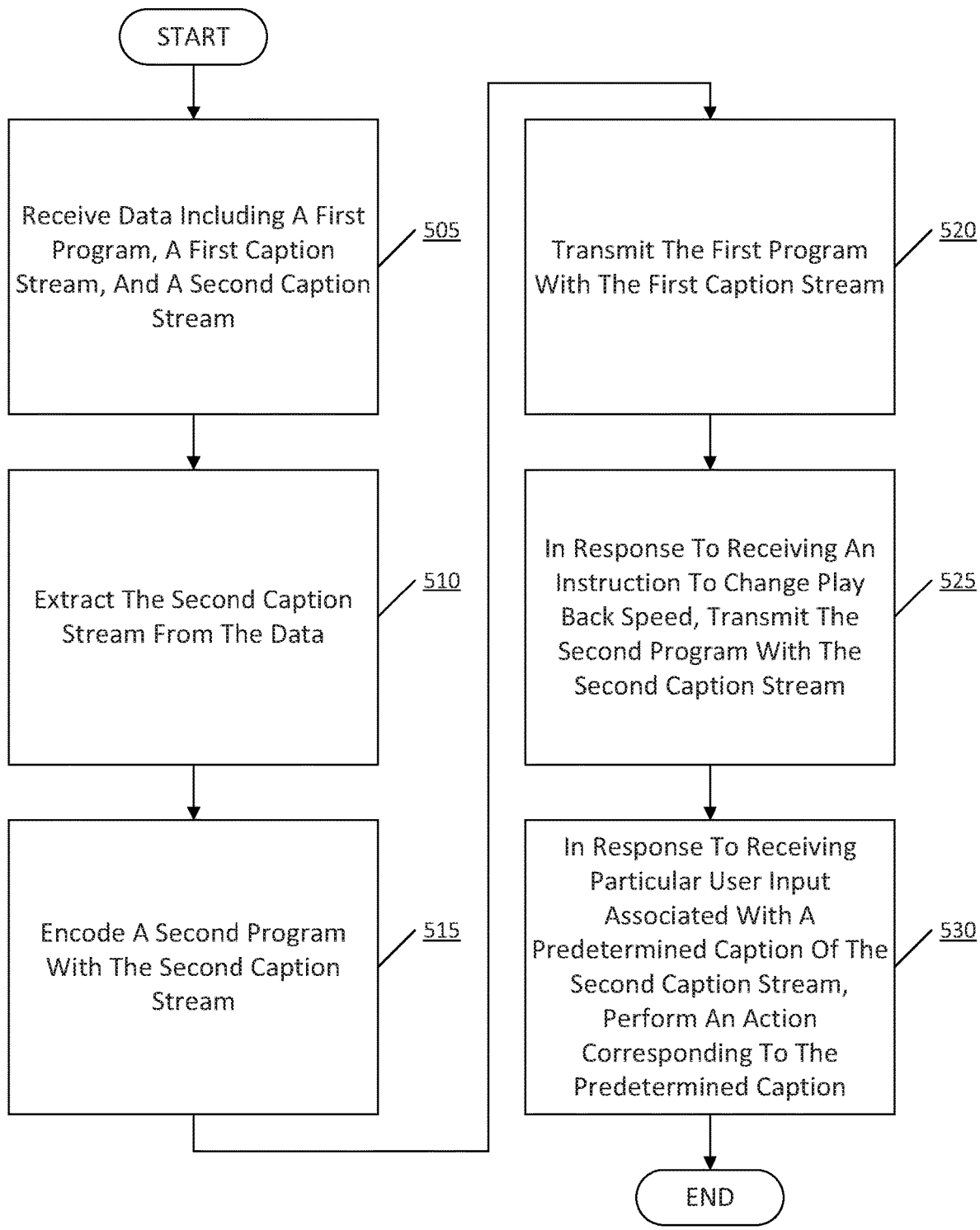
FIG. 5 illustrates an example method by which enhanced content may be provided according to one or more aspects described herein.

FIG. 5 illustrates an example method by which enhanced content may be provided according to one or more aspects described herein. More particularly, FIG. 5 illustrates an example method by which a "trick" file (which is further described below) or other video data file may be encoded with a closed caption stream. According to one or more aspects, any and/or all of the methods described herein may be implemented by one or more computing devices (e.g., gateway 102, computing device 116, display device 118, server 205, etc.) operating alone or in combination with other devices.

In one or more arrangements, a trick file may comprise a data file that includes a video program which has been encoded at an alternate playback speed (e.g., four times as fast forward, four times as fast reverse, half speed slow motion, etc.). Thus, in an example where a video program is transmitted from a server 205 to a gateway 102, where the gateway 102 then plays back the video program, a trick file may be used to simulate a fast forward or rewind operation at the gateway 102 without significantly increasing (and/or possibly maintaining as constant) the bandwidth required for transmitting the video program.

For instance, to simulate a fast forward operation for a video program being displayed at the gateway 102, server 205 may transmit (and gateway 102 may receive) a trick file in which the video program is encoded at four times the normal playback speed. Because the trick file will include the video program at four times the normal playback speed, it will simulate a fast forward operation to a user of gateway 102 who may have given a command to fast forward through content displayed by the gateway 102. While the fast forward may be simulated, however, the trick file itself might include only the same or similar amount of data (or possibly less) as the normal-speed video program (e.g., the trick file may include data encoded at the same or lower data rate or "bit rate" as the normal-speed video program). Thus, simulating the four times fast forwarding of the video program might not require using four times the bandwidth as transmitting the normal-speed video program. Of course, similar trick files could be generated in similar ways to simulate other playback speeds, such as rewind, increased fast forward, slow motion, and/or the like.

In currently existing systems, a trick file might not include an audio stream or a closed caption stream, as such a trick file might only include a video stream encoded at an alternate playback speed. According to one or more aspects of the disclosure, however, a trick file may be encoded with a closed caption stream, and the closed caption stream of the trick file may include one or more enhanced captions, such as one or more of the enhanced captions described above.

As stated above, an example method by which a trick file may be encoded with a closed caption stream is illustrated in FIG. 5. In step 505, data may be received, and the data may include a first program (or content), a first caption stream associated with the first program, and a second caption stream associated with the first program.

In one or more arrangements, the data may be received by a server 205, such as a headend, content distribution center, central office, etc., which may encode and/or transmit information associated with video content. The data may be in the form of one or more MPEG (Moving Picture Experts Group) data files, for example, and may include one or more video programs, including the first program. In at least one arrangement, the one or more data files may be received from a central source for distribution via one or more content servers, such as the server receiving the one or more data files. In such an arrangement, the content servers may generate one or more trick files for each of the video programs included in the one or more data files by continuing to perform one or more steps of the example method. In at least one additional arrangement, data may be received from different sources. For example, a server receiving the data may receive first data including the first program and the first caption stream from a first source (e.g., another server), and the server further may receive second data including the second caption stream from a second source different from the first source (e.g., yet another server).

According to one or more aspects, a plurality of caption streams may be associated with each video program that may be included in the data. For example, the first program may have a first caption stream, which may be associated with a "CC1" data channel, and a second caption stream, which may be associated with a "CC2" data channel and/or a "CC3" data channel. In one or more arrangements, the first caption stream may include captions that represent a transcript of the audio portion of the first program. The captions in the first stream thus may be intended for display with the first program when the first program is played back at a normal speed. Additionally or alternatively, the second caption stream may include captions that represent enhanced captions associated with the first program. For example, the second caption stream may include captions that represent scene descriptions, time counters, recommendations, advertising material, and/or other types of enhanced content (e.g., as further described above with respect to FIGS. 4A-4I). The captions in the second stream may be intended for display with the first program when the first program is played back at an alternate speed (e.g., fast forward, rewind, slow motion, etc.). In at least one arrangement, the captions in the second stream, which may include enhanced captions, may be intended for display with the first program when the first program is played back at the normal speed. As further described below with respect to this example method, a server that receives data in step 505 may use captions from the second caption stream to encode one or more trick files that include enhanced captions.

In at least one arrangement, the data received in step 505 might only include the first program and a first caption stream associated with the first program. In such an arrangement, the second caption stream associated with the first program may be generated by the device receiving the data (e.g., server 205). For example, where server 205 receives data in step 505 that only includes the first program and the first caption stream, and where the second caption stream is to include time counters, server 205 may generate one or more time counters for inclusion in the second caption stream. In at least one additional arrangement, a device (e.g., server 205) may generate enhanced content for inclusion in the second caption stream even when the data received in step 505 includes the second caption stream. For instance, server 205 may receive data in step 505 that includes the first program, the first caption stream, and the second caption stream, and server 205 still may generate one or more time counters for inclusion in the second caption stream.

In step 510, the second caption stream may be extracted from the received data. For example, having received the data in step 505, the server 205 may extract the second caption stream from the data (e.g., the server may read data associated with the second caption stream and store such data in a new and/or different file).

In step 515, a second program (e.g., a video asset) may be encoded with the second caption stream. For example, having received the data in step 505 and/or extracted the second caption stream from the data in step 510, the server 205 may encode a second program with the second caption stream (e.g., by inserting the captions from the second caption stream into a data channel of the second program). The second program may represent a trick file, and as described above, the second caption stream may include one or more enhanced captions. Additionally or alternatively, where the second program represents a trick file encoded at a different playback speed than the first program (e.g., where the second program is a trick file that is configured to simulate the first program being fast forwarded), encoding the second program may include sampling a plurality of frames of the first program in a particular order and/or at a particular interval and creating a new video program that includes the sampled frames in the particular order and/or at the particular interval. Thus, when the second program is played back on a device (e.g., via a gateway, such as gateway 102), one or more enhanced captions may be displayed and/or alternate-speed play back of the first program may be simulated (e.g., where the second program represents a trick file encoded at a different playback speed than the first program).

In at least one arrangement, the second caption stream may be encoded in a data channel of the second program (e.g., CC1) that corresponds to the data channel in which the first caption stream is encoded in the first program (e.g., CC1). In an example where the second caption stream is encoded in a corresponding data channel of the second program, and where a user is viewing the first caption stream with the first program, the enhanced captions thus may be displayed automatically when the user causes the second program to be displayed (e.g., by pressing fast forward or otherwise causing the second program, which may be a trick file, to displayed in place of the first program).

In step 520, the first program may be transmitted with the first caption stream. The first program may include first content configured to be played back at a first speed, and the first caption stream may include first captions that also may be configured to be played back at the first speed. For example, in step 520, the server (e.g., server 205) may transmit the first program to a gateway (e.g., gateway 102), and a user of the gateway may view the first program. The gateway may play back the first program at a first speed, which may represent the normal playback speed of the first program. In addition, the gateway may play back the first caption stream at the first speed such that the captions included in the first caption stream are displayed synchronously with the first program.

In step 525, in response to receiving an instruction to change play back speed, the second program may be transmitted with the second caption stream. The second program may include the first content configured to be played back at a second speed different from the first speed, and the second caption stream may include second captions different from the first captions.

For example, having transmitted and/or while transmitting the first program with the first caption stream in step 520, the server (e.g., server 205) may receive an instruction to change play back speed. The instruction may be received by the server (e.g., server 205) from a gateway, such as gateway 102, which may have sent the instruction after receiving user input corresponding to a command to change play back speed (e.g., a user pressing fast forward or rewind on a remote control, a user selecting fast forward or rewind on an on-screen display, etc.). In response to receiving the instruction, the server (e.g., server 205) may transmit (and/or begin to transmit) the second program in place of the first program, as the second program may represent a trick file that includes the first program encoded at a different play back speed. In addition, the second program may include the second caption stream, which the server (e.g., server 205) may transmit with the second program, and the second caption stream may include one or more enhanced captions, as further described above. Additionally or alternatively, although the play back of the second program may simulate an alternate-speed play back of the first program, the captions of the second caption stream may be displayed at a normal playback speed (e.g., a playback speed at which the captions are viewable and/or readable), even though the captions of the second caption stream may coincide with the playback of the second program.

In optional step 530, in response to receiving particular user input associated with a predetermined caption of the second captions, an action corresponding to the predetermined caption may be performed. For example, having transmitted and/or while transmitting the first program and/or the second program in one or more of the previous steps described above, the server (e.g., server 205) may receive particular user input associated with a predetermined caption of the second captions. The particular input may be transmitted to the server (e.g., server 205) from a device at a user location (e.g., gateway 102). In at least one arrangement, the particular user input may be in response to a prompt displayed via the predetermined caption. For instance, the predetermined caption may include a prompt similar to the prompt included in enhanced caption 436 of FIG. 4I, as further described above, which may invite a user to press a key and/or make a selection to display additional content. In response to receiving user input corresponding to the particular key press and/or selection, the additional content may be displayed.

While one or more of the foregoing examples may describe extracting a caption stream from data that includes a video program in order to encode a trick file that includes the caption stream, similar steps could be performed to extract multiple caption streams from the data to encode multiple trick files based on the program. Additionally or alternatively, one or more of such caption streams may include enhanced captions, as further described above. For example, a first caption stream could be extracted from data to encode a first trick file, where the first trick file may simulate fast forwarding a program at four-times the normal playback speed of the program, and a second caption stream could be extracted from the same data to encode a second trick file, where the second trick file may simulate rewinding the program at two-times the normal playback speed of the program. Moreover, in this example, both or either of the first caption stream and/or the second caption stream may include enhanced captions, such as scene descriptions, time counters, recommendations, advertising material, and/or other types of enhanced content (e.g., as further described above with respect to FIGS. 4A-4I).

Furthermore, while one or more of the foregoing examples may describe a server (e.g., server 205) performing one or more aspects of the example method illustrated in FIG. 5, similar aspects of the example method may be performed by a gateway (e.g., gateway 102) and/or other user device. For example, gateway 102 may receive data including a first program, a first caption stream, and a second caption stream. Subsequently, gateway 102 may extract the second caption stream from the data. In at least one arrangement, the received data might not include the second caption stream, and gateway 102 may generate enhanced content for inclusion in the second caption stream. Additionally or alternatively, gateway 102 may generate enhanced content for inclusion in the second caption stream even where the received data includes the second caption stream.

In addition, in this example, gateway 102 then may encode a second program with the second caption stream. Subsequently, gateway 102 may transmit the first program with the first caption stream. As further described above, the first program may include first content configured to be played back at a first speed, and the first caption stream may include first captions that also may be configured to be played back at the first speed. For example, gateway 102 may transmit the first program with the first caption stream to an attached and/or connected display device for display to a user (e.g., display device 118). In at least one arrangement, such transmission may involve sending electrical signals via a component video connection, HDMI (high-definition multimedia interface) link, and/or other medium to a display device.

Further, in this example, in response to receiving an instruction to change play back speed, gateway 102 may transmit the second program with the second caption stream. As further described above, the second program may include the first content configured to be played back at a second speed different from the first speed, and the second caption stream may include second captions different from the first captions. For example, gateway 102 may receive an instruction to change play back speed from a user via a user interface and/or a remote control, and in response to receiving such an instruction, gateway 102 may transmit the second program with the second caption stream to the display device (e.g., display device 118). The display device then may display the second program and/or the second caption stream.

Additionally or alternatively, in this example, in response to receiving particular user input associated with a predetermined caption of the second captions, gateway 102 may perform an action corresponding to the predetermined caption. For example, and as further described above, the predetermined caption may include a prompt (e.g., "Press A to see more information about B."), and in response to receiving the particular user input, gateway 102 may perform an action corresponding to the prompt (e.g., if a user selects "A," gateway 102 may transmit information about "B" to the display device for display).

Figure 6:
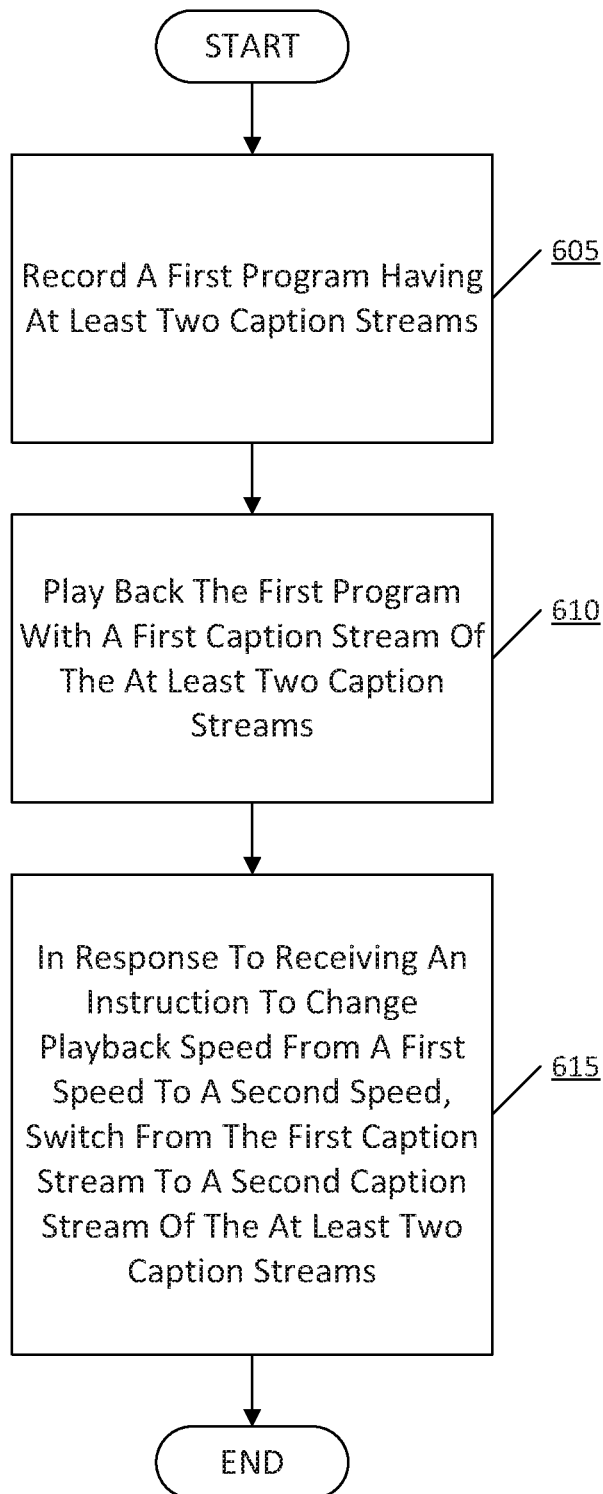
FIG. 6 illustrates another example method by which enhanced content may be provided according to one or more aspects described herein.

FIG. 6 illustrates another example method by which enhanced content may be provided according to one or more aspects described herein. More particularly, FIG. 6 illustrates an example method by which enhanced captions may be displayed. According to one or more aspects, any and/or all of the methods described herein may be implemented by one or more computing devices (e.g., gateway 102, computing device 116, display device 118, server 205, etc.) operating alone or in combination with other devices.

In step 605, a first program having at least two caption streams may be recorded. For example, a device (e.g., gateway 102, display device 118, etc.) may include storage media, such as a hard drive and/or flash memory, and may record a first program to the storage media. The first program may include at least two caption streams, and the device may record the at least two caption streams along with other data associated with the first program (e.g., video data, audio data, etc.).

In step 610, the first program may be played back with a first caption stream of the at least two caption streams. For example, having recorded the first program (or a portion of the first program), the device (e.g., gateway 102) may playback the first program (or a portion of the first program). This playback may begin in response to user input. In addition, when the device plays back the first program, the device also may display one or more captions of the first caption stream. In at least one arrangement, the one or more captions included in the first caption stream may represent a transcript of the audio portion of the first program.

In step 615, in response to receiving an instruction to change playback speed from a first speed to a second speed, a second caption stream of the at least two caption streams may be switched to from the first caption stream. The first caption stream may be associated with the first speed, and the second caption stream may be associated with the second speed. Alternatively, a user may switch from the first caption stream to the second caption stream, without changing playback speed, if, for example, the user is interested in viewing enhanced captions rather than the captions in the first caption stream.

For example, having recorded the first program (or a portion of the first program), the device (e.g., gateway 102) may be able to control the playback speed of the first program locally (e.g., by sampling the video data and/or other data associated with the first program at a faster or slower rate), which might not involve a trick file. In this example, however, it still may be desirable to display enhanced captions during the alternate-speed playback operation. In at least one arrangement, the second caption stream of the at least two caption streams may include enhanced captions, which are further described above. Thus, when the device plays back the first program at an alternate speed, the device also may display one or more captions of the second caption stream in place of one or more captions of the first caption stream.

In one or more arrangements, a user may select a particular caption stream to be displayed (e.g., while viewing programming at a particular speed). For example, a user may select a first caption stream to be displayed while viewing programming at a normal playback speed, and the user may select a second caption stream to be displayed while viewing programming at an alternate playback speed. The first caption stream may include captions that represent a transcript of the audio portion of the programming, and the second caption stream may include enhanced captions associated with the programming. In at least one additional arrangement, the user may select a caption stream (e.g., the first caption stream or the second caption stream) to be displayed while viewing programming at a normal playback speed, where the caption stream includes enhanced captions associated with the programming. For instance, the user may begin viewing programming at a normal playback speed, and subsequently, the user may select a caption stream to be displayed that includes one or more scene descriptions, time counters, recommendations, advertising, and/or other enhanced content, as further described above. Of course, after selecting one caption stream to be displayed in this example, if the user were to later decide that he or she would like a different caption stream to be displayed while viewing the programming, the user could thereafter select whichever caption stream he or she would like to be displayed. Additionally or alternatively, the one or more captions streams corresponding to the one or more playback speeds may be selected and/or set automatically by the system based on the selected playback speed (e.g., the system may switch caption streams in response to receiving an instruction to change playback speed, as described above).

In at least one additional arrangement, where a user is viewing video on demand (VOD) content, a system implementing one or more aspects of the disclosure (e.g., a system comprising one or more of the devices described herein) may provide the user with the ability to select a caption stream to be displayed from a plurality of caption streams. For example, a user interface that includes a selectable menu may be displayed to a user, and the menu may list one or more caption streams available for display. At least one of the caption streams may include enhanced content, as further described above. Additionally or alternatively, the user interface may allow the user to specify which (if any) caption streams are to be displayed at which playback speeds. For example, the user interface may allow the user to specify that a caption stream which includes scene descriptions is to be displayed during normal speed playback, and the user interface further may allow the user to specify that a different caption stream which includes time counters is to be displayed during fast forwarding and rewinding operations. Subsequently, the system may display VOD and/or other programming with one or more caption streams in accordance with the user's selections.

According to one or more aspects, one or more servers 205 (e.g., headend, content distribution center, central office, etc.) thus may be configured to transmit one or more programs that each may include at least two caption streams. Additionally or alternatively, for each of the one or more programs, at least one of the at least two caption streams may include enhanced captions that may be configured to be played back during an alternate-speed playback operation. For example, the server 205 may be configured to transmit the first program in the example above with a first caption stream that includes first captions to be displayed when the first program is played back at a normal playback speed and second captions to be displayed when the first program is played back at an alternate playback speed different from the normal playback speed. In this way, a device (e.g., gateway 102) may be able to perform one or more steps of the example method described above with respect to FIG. 6.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. A method comprising:
   sending, to a computing device via a network, content and first caption data configured to be output while a plurality of frames of the content is output;
   receiving, from the computing device, a command to output a subset of frames among the plurality of frames of the content; and based on the command, sending, to the computing device, second caption data configured to be output while the subset of frames is output.

2. The method of claim 1, further comprising:
determining, based on a parameter indicated by the command, the second caption data.

3. The method of claim 1, further comprising:
determining, based on whether the command comprises a rewind request or a fast forward request, the second caption data,
wherein the second caption data differs depending on whether the command comprises the rewind request or the fast forward request.

4. The method of claim 1, wherein the sending the second caption data causes output of the second caption data.

5. The method of claim 1, wherein the second caption data comprises a plurality of frames that are configured to be output consecutively while the subset of frames is output.

6. The method of claim 1, wherein the second caption data comprises an advertisement for an item shown in the content.

7. The method of claim 1,
wherein the second caption data indicates at least one of a title of a scene, a description of the scene, an actor or actress name in the scene, a chapter number of the scene, a time elapsed in the scene, or a time remaining in the scene, and
wherein the scene corresponds to a segment of the content.

8. The method of claim 1, wherein the computing device comprises a gateway, a set-top box, or a digital video recorder.

9. The method of claim 1, further comprising:
determining, based on one or more of a time of the receiving the command or a date of the receiving the command, advertising content for the second caption data.

10. The method of claim 1, further comprising:
determining, based on one or more of a geographical location associated with the computing device or demographic information associated with the computing device, advertising content for the second caption data.

11. A system comprising:
one or more first computing devices; and
a second computing device;
wherein the one or more first computing devices are configured to:
send, to the second computing device via a network, content and first caption data configured to be output while a plurality of frames of the content is output;
receive, from the second computing device, a command to output a subset of frames among the plurality of frames of the content; and
based on the command, send, to the second computing device, second caption data configured to be output while the subset of frames is output; and
wherein the second computing device is configured to receive the content, the first caption data, and the second caption data.

12. The system of claim 11, wherein the one or more first computing devices are configured to determine, based on a parameter indicated by the command, the second caption data.

13. The system of claim 11, wherein the one or more first computing devices are configured to:
determine, based on whether the command comprises a rewind request or fast forward request, the second caption data,
wherein the second caption data differs depending on whether the command comprises the rewind request or the fast forward request.

14. The system of claim 11, wherein the second caption data comprises advertising content or an interactive prompt that, after being selected, causes an action to be performed.

15. The system of claim 11, wherein the second computing device comprises a gateway, a set-top box, or a digital video recorder.

16. An apparatus comprising:
one or more processors; and
memory storing instructions that, when executed by the one or more processors, cause the apparatus to:
send, to a computing device via a network, content and first caption data configured to be output while a plurality of frames of the content is output;
receive, from the computing device, a command to output a subset of frames among the plurality of frames of the content; and
based on the command, send, to the computing device, second caption data configured to be output while the subset of frames is output.

17. The apparatus of claim 16, wherein the instructions, when executed, cause the apparatus to determine, based on a parameter indicated by the command, the second caption data.

18. The apparatus of claim 16, wherein the instructions, when executed, cause the apparatus to:
determine, based on whether the command comprises a rewind request or fast forward request, the second caption data,
wherein the second caption data differs depending on whether the command comprises the rewind request or the fast forward request.

19. The apparatus of claim 16, wherein the second caption data comprises advertising content or an interactive prompt that, after being selected, causes an action to be performed.

20. The apparatus of claim 16, wherein the instructions, when executed, cause the apparatus to send the second caption data to a gateway, a set-top box, or a digital video recorder.

* * * * *